(12) United States Patent
Salmela et al.

(10) Patent No.: US 11,685,096 B2
(45) Date of Patent: Jun. 27, 2023

(54) METHOD FOR MANUFACTURING FIBROUS YARN

(71) Applicant: SPINNOVA OY, Jyvaskyla (FI)

(72) Inventors: Juha Salmela, Jyvaskyla (FI); Harri Kiiskinen, Jyvaskyla (FI); Antti Oksanen, Jyvaskyla (FI)

(73) Assignee: SPINNOVA OY, Jyvaskyla (FI)

(*) Notice: Subject to any disclaimer, the term of this patent is extended or adjusted under 35 U.S.C. 154(b) by 386 days.

(21) Appl. No.: 17/017,807

(22) Filed: Sep. 11, 2020

(65) Prior Publication Data

US 2020/0406525 A1 Dec. 31, 2020

Related U.S. Application Data

(62) Division of application No. 14/984,101, filed on Dec. 30, 2015, now abandoned, which is a division of (Continued)

(30) Foreign Application Priority Data

Sep. 8, 2011 (FI) .................................... 20115882

(51) Int. Cl.
*D01D 1/02* (2006.01)
*D01D 5/00* (2006.01)
(Continued)

(52) U.S. Cl.
CPC ............ *B29C 48/885* (2019.02); *B29C 48/05* (2019.02); *D01D 5/04* (2013.01); *D01D 5/11* (2013.01); *D01D 10/02* (2013.01); *D01F 1/10* (2013.01); *D01F 2/24* (2013.01); *D01F 2/26* (2013.01); *D01F 2/28* (2013.01); *D02G 3/02* (2013.01); *D02G 3/04* (2013.01); *D02G 3/042* (2013.01); *D02G 3/045* (2013.01); *D02G 3/08* (2013.01); *D02G 3/22* (2013.01); *D21F 11/16* (2013.01); *B29C 2791/003* (2013.01); (Continued)

(58) Field of Classification Search
CPC ........ B01D 37/00; B01D 43/00; B29C 41/16; B29C 41/26; B29C 41/46; B29C 41/50; B29C 71/02; B29C 2791/003; B29C 2791/006; D01D 1/02; D01D 5/00; D01D 7/00; D01D 10/02; D01F 1/10; D01F 2/02; D01F 2/24; D02G 3/02; D10B 2201/01; D10B 2201/02; D10B 2201/04; D10B 2201/06; D10B 2201/08; D10B 2201/10; D10B 2201/22
USPC ....... 264/37.1, 37.18, 86, 87, 101, 102, 103, 264/207, 211.12, 211.17, 234; 210/767, 210/805
See application file for complete search history.

(56) References Cited

U.S. PATENT DOCUMENTS

| | | | | |
|---|---|---|---|---|
| 6,979,386 B1 * | 12/2005 | Wallajapet | ........... | D21H 27/002 162/146 |
| 2006/0081348 A1 * | 4/2006 | Graef | .................. | A61F 13/5376 604/385.01 |
| 2012/0227920 A1 * | 9/2012 | Juppo | .................... | D21H 21/10 977/773 |

FOREIGN PATENT DOCUMENTS

EP 0543866 B1 * 11/1995 ......... B01D 19/0052

* cited by examiner

*Primary Examiner* — Leo B Tentoni
(74) *Attorney, Agent, or Firm* — ArentFox Schiff LLP; Michael Fainberg

(57) ABSTRACT

Disclosed is a method for the manufacture of fibrous yarn including the steps, where an aqueous suspension including fibers and at least one rheology modifier is provided, fol-
(Continued)

lowed by directing the suspension through at least one nozzle, to form at least one yarn, and then dewatering the yarn.

15 Claims, 2 Drawing Sheets

Related U.S. Application Data application No. 14/727,118, filed on Jun. 1, 2015, now Pat. No. 9,200,383, which is a division of application No. 14/343,928, filed as application No. PCT/FI2012/050877 on Sep. 10, 2012, now abandoned.

(51) Int. Cl.
| | | |
|---|---|---|
| *D01D 7/00* | (2006.01) | |
| *D01F 2/02* | (2006.01) | |
| *B01D 37/00* | (2006.01) | |
| *B01D 43/00* | (2006.01) | |
| *B29C 48/885* | (2019.01) | |
| *D01F 2/28* | (2006.01) | |
| *D01D 10/02* | (2006.01) | |
| *D01F 2/24* | (2006.01) | |
| *D01D 5/04* | (2006.01) | |
| *D01F 2/26* | (2006.01) | |
| *D01D 5/11* | (2006.01) | |
| *B29C 48/05* | (2019.01) | |
| *D21F 11/16* | (2006.01) | |
| *D02G 3/02* | (2006.01) | |
| *D02G 3/22* | (2006.01) | |
| *D01F 1/10* | (2006.01) | |
| *D02G 3/08* | (2006.01) | |
| *D02G 3/04* | (2006.01) | |
| *B29K 105/06* | (2006.01) | |
| *B29K 301/00* | (2006.01) | |
| *B29K 305/00* | (2006.01) | |
| *B29K 309/08* | (2006.01) | |
| *B29K 311/10* | (2006.01) | |
| *B29L 31/00* | (2006.01) | |

(52) U.S. Cl.
CPC .... *B29C 2791/006* (2013.01); *B29K 2105/06* (2013.01); *B29K 2301/00* (2013.01); *B29K 2305/00* (2013.01); *B29K 2309/08* (2013.01); *B29K 2311/10* (2013.01); *B29L 2031/707* (2013.01); *D10B 2101/06* (2013.01); *D10B 2101/20* (2013.01); *D10B 2201/00* (2013.01); *D10B 2201/01* (2013.01); *D10B 2201/02* (2013.01); *D10B 2201/04* (2013.01); *D10B 2201/08* (2013.01); *D10B 2201/10* (2013.01); *D10B 2201/20* (2013.01); *D10B 2201/22* (2013.01); *D10B 2401/12* (2013.01); *D10B 2501/00* (2013.01); *D10B 2503/00* (2013.01); *D10B 2505/20* (2013.01); *D10B 2509/02* (2013.01)

METHOD FOR MANUFACTURING FIBROUS YARN

CROSS-REFERENCE TO RELATED APPLICATIONS

This application is a divisional application that claims the benefit of U.S. Non-Provisional Application No. 14/984,101, (abandoned), filed Dec. 30, 2015, which is a divisional application of U.S. Non-Provisional Application No. 14/727,118, now U.S. Pat. No. 9,200,383 B2, filed Jun. 1, 2015, which is further a divisional application of U.S. Non-Provisional Application No. 14/343,928 (abandoned), filed Jul. 9, 2014, which is a National Stage Entry of PCT/FI2012/050877 (published), filed Sep. 9, 2012, all of which are herein incorporated by reference.

FIELD OF TECHNOLOGY

The invention relates to a new method for the manufacture of fibrous yarn, and particularly for the manufacture of paper yarn. Further, the invention relates to fibrous yarn obtainable by said method, as well as uses of said fibrous yarn.

BACKGROUND

Many different types of yarns made of natural fibers are known in the art. One well known example is paper yarn, which is traditionally manufactured from paper sheets. The first and only industrial method was developed in the late 19th century in Germany. It has been refined over time but the basic principle has remained the same and it is still in use today. Typically, paper manufactured from chemical, mechanical or chemi-mechanical pulp is slit to strips (width typically from 5 to 40 mm), which are twisted to thread. Said thread may be subjected to dyeing and finishing. The product (paper yarn) has limited applications because of deficiencies in its properties, such as limited strength, unsuitable thickness, layered or folded structure, and further, the manufacturing method is inefficient.

Cotton is very widely used as raw material in the manufacture of yarns and ropes. However, the cultivation of cotton requires significant water resources and it is widely carried out in regions where there is shortage of water and food. When available water is used for the irrigation of cotton fields, the situation with regard to food supply becomes worse. Thus the use of cotton does not support sustainable development, and there is a need for alternative sources of fiber, suitable for replacing cotton at least partly.

SUMMARY

An object of the present invention is to provide a new method for the manufacture of fibrous yarn.

A further object is to provide a sustainable source of fibers for fibrous yarn. A still further object is to provide fibrous yarn with improved and adjustable properties, suitable for varying applications of yarn.

Aspects of the invention are thus directed to a method for the manufacture of fibrous yarn, said method comprising the steps of providing an aqueous suspension comprising fibers and at least one rheology modifier, directing said suspension through at least one nozzle having an inner diameter of the outlet smaller than or equal to the maximum length weighed fiber length of the fibers, to form at least one yarn, and subjecting said yarn to dewatering.

Aspects of the invention are also directed to a yarn comprising fibers and at least one rheology modifier. Said yarn is obtainable by the method described above.

Aspects of the invention are also directed to the use and method of use of the obtained yarn in decoration, interior decor, furniture, clothes, bandages, dressings, textiles, in construction materials etc.

Particularly, the ease of manufacture of the fibrous yarn, applicability of the yarn to various sites of use, possibility to design the properties of the yarn according to the intended use, small water footprint, biodegradability are some examples of the desired benefits achieved by the present invention.

The characteristic features of the invention are presented in the appended claims.

DEFINITIONS

Figure 1:
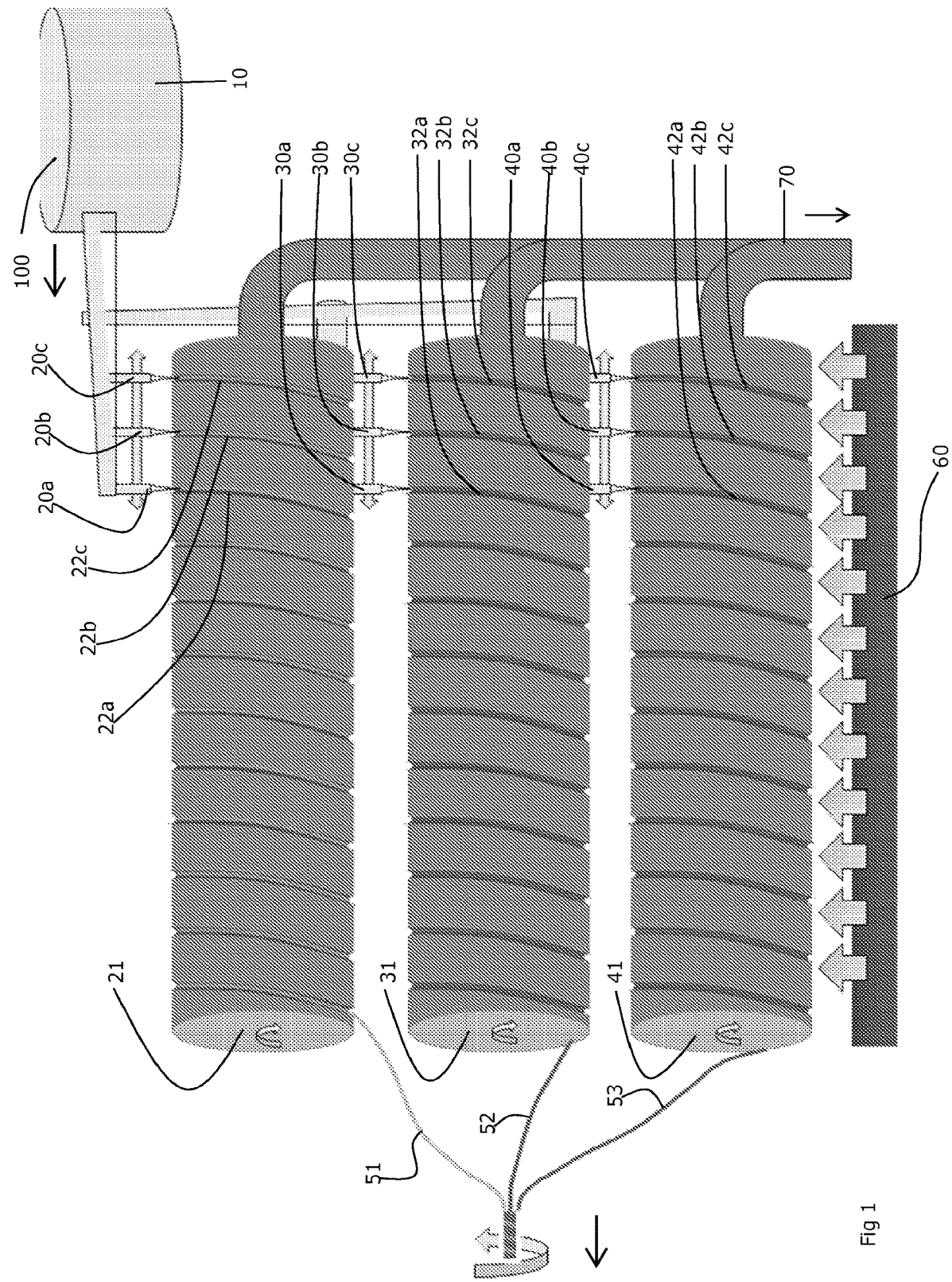
FIG. 1 depicts one embodiment of the manufacturing method, where the yarn is produced on rotating drums.

Unless otherwise specified, the terms, which are used in the specification and claims, have the meanings commonly used in the field of paper and pulp manufacture, as well as in the field of yarn manufacture. Specifically, the following terms have the meanings indicated below.

The term "yarn" refers here to thread, yarn, chord, filament, wire, string, rope and strand.

The term "rheology modifier" is understood to mean here a compound or agent capable of modifying the viscosity, yield stress, thixotropy of the suspension.

DETAILED DESCRIPTION

It was surprisingly found that fibrous yarn can be manufactured in a very simple and efficient way directly from a suspension comprising fibres and at least one rheology modifier, whereby it not necessary to manufacture first paper or other fibrous product, which is sliced into strips and wound to a yarn.

The method according to the invention, for the manufacture of fibrous yarn comprises the steps, where an aqueous suspension comprising fibers and at least one rheology modifier is provided, followed by directing said suspension through at least one nozzle having an inner diameter of the outlet smaller than or equal to the maximum length weighed fiber length of the fibers, to form at least one yarn, and then subjecting said yarn to dewatering.

Here "maximum length weighed fiber length of the fibers" means length weighted fiberlength where 90% of fibers are shorter or equal to this length. Fiber length may be measured with any suitable method used in the art.

The aqueous suspension in understood to mean any suspension comprising water and fibers originating from any and at least one plant based raw material source, including cellulose pulp, refined pulp, waste paper pulp, peat, fruit pulp, or pulp from annual plants. The fibers may be isolated from any cellulose containing material using chemical, mechanical, thermo-mechanical, or chemi-thermo-mechanical pulping processes.

The plant based raw material source may be a virgin source or recycled source or any combination thereof. It may be wood or non-wood material. The wood can be softwood tree such as spruce, pine, fir, larch, douglas-fir or hemlock, or hardwood tree such as birch, aspen, poplar, alder, eucalyptus or acacia, or a mixture of softwoods and hardwoods. The non-wood material can be plant, such as straw, leaves, bark, seeds, hulls, flowers, vegetables or fruits from corn, cotton, wheat, oat, rye, barley, rice, flax, hemp, manilla hemp, sisal hemp, jute, ramie, kenaf, bagasse, bamboo, reed or peat.

Suitably virgin fibers originating from pine may be used. Said fibers typically may have average length weighed fiber length from 2 to 3 mm. Also combinations of longer fibers with shorter ones may be used, for example fibers from pine with fibers from eucalyptus.

The aqueous suspension may comprise from 0.1 to 10% w/w, preferably from 0.2 to 2% w/w of fibers originating from any plant based raw material source.

Additionally the suspension may optionally comprise virgin or recycled fibers originating from synthetic materials, such as glass fibers, polymeric fibers, metal fibers, or from natural materials, such as wool fibers, or silk fibers.

The aqueous suspension may comprise at least one rheology modifier that forms a gel by crosslinking the suspension, suitably selected from alginic acid, alginates such as sodium alginate, pectin, carrageenan, and nanofibrillar cellulose (NFC), or a combination of rheology modifiers. In the presence of cations, particularly divalent or multivalent cations, suitably such as $Ca^{2+}$, $Mg^{2+}$, $Sr^{2+}$ or $Ba^{2+}$, alginate, pectin and carrageenan (carrageenan cross-links also with $K^+$) readily form a stable and strong gel. In the cross-linking of these polysaccharides calcium chloride is preferably used. The concentration of salt solution may vary from 1% w/w to 10% w/w.

Typically the poly-L-guluronic acid (G-block) content of alginate, poly-D-galacturonic acid content of pectin or carrageenan and the amount of divalent or multivalent cations (calcium ions) are regarded as being involved in determining gel strength.

The term "nanofibrillar cellulose" or "nanofibrillated cellulose" refers to a collection of isolated cellulose microfibrils or microfibril bundles derived from cellulose raw material. Microfibrils have typically high aspect ratio: the length might exceed one micrometer while the number-average diameter is typically below 200 nm. The diameter of microfibril bundles can also be larger but generally less than 1 pm. The smallest microfibrils are similar to so called elementary fibrils, which are typically 2-12 nm in diameter. The dimensions of the fibrils or fibril bundles are dependent on raw material and disintegration method. The nanofibrillar cellulose may also contain some hemicelluloses; the amount is dependent on the plant source. Mechanical disintegration of microfibrillar cellulose from cellulose raw material, cellulose pulp, or refined pulp is carried out with suitable equipment such as a refiner, grinder, homogenizer, colloider, friction grinder, ultrasound sonicator, fluidizer such as microfluidizer, macrofluidizer or fluidizer-type homogenizer. In this case the nanofibrillar cellulose is obtained through disintegration of plant cellulose material and can be called "nanofibrillated cellulose". "Nanofibrillar cellulose" can also be directly isolated from certain fermentation processes. The cellulose-producing micro-organism of the present invention may be of the genus *Acetobacter, Agrobacterium, Rhizobium, Pseudomonas* or *Alcaligenes,* preferably of the genus *Acetobacter* and more preferably of the species *Acetobacterxylinum* or *Acetobacterpasteurianus.* "Nanofibrillar cellulose" can also be any chemically or physically modified derivate of cellulose nanofibrils or nanofibril bundles. The chemical modification could be based for example on carboxymethylation, oxidation, esterification, or etherification reaction of cellulose molecules. Modification could also be realized by physical adsorption of anionic, cationic, or non-ionic substances or any combination of these on cellulose surface. The described modification can be carried out before, after, or during the production of microfibrillar cellulose.

The nanofibrillated cellulose can be made of cellulose which is chemically premodified to make it more labile. The starting material of this kind of nanofibrillated cellulose is labile cellulose pulp or cellulose raw material, which results from certain modifications of cellulose raw material or cellulose pulp. For example N-oxyl mediated oxidation (e.g. 2,2,6,6-tetramethyl-1-piperidine N-oxide) leads to very labile cellulose material, which is easy to disintegrate to microfibrillar cellulose. For example patent applications WO 09/084566 and JP 20070340371 disclose such modifications. The nanofibrillated cellulose manufactures through this kind of premodification or "labilization" is called "NFC-L" for short, in contrast to nanofibrillated cellulose which is made of not labilized or "normal" cellulose, NFC-N.

The nanofibrillated cellulose is preferably made of plant material where the nanofibrils can be obtained from secondary cell walls. One abundant source is wood fibres. The nanofobrillated cellulose is manufactured by homogenizing wood-derived fibrous raw material, which may be chemical pulp. When NFC-L is manufactured from wood fibres, the cellulose is labilized by oxidation before the disintegration to nanofibrils. The disintegration in some of the above-mentioned equipment produces nanofibrils which have the diameter of only some nanometers, which is 50 nm at the most and gives a clear dispersion in water. The nanofibrils can be reduced to size where the diameter of most of the fibrils is in the range of only 2-20 nm only. The fibrils originating in secondary cell walls are essentially crystalline with degree of crystallinity of at least 55%.

Said rheology modifier may be used in an amount from 0.1 to 20 weight %. Concentration of the rheology modifier, such as alginate is preferably 0.5-20% w/w.

The suspension may comprise also at least onedispersion agent that is typically anionic long chained polymer or NFC, or a combination of dispersion agents. Examples of suitable dispersion agents are carboxymethyl cellulose (CMC), starch (anionic or neutral) and anionic polyacrylamides (APAM), having high molecular weight. Dispersion agent modifies the suspension rheology to make the suspension shear thinning. Preferably at high shear rates (500 1/s) shear viscosity is less than 10% of zero shear viscosity of the suspension.

Said dispersion agent may be used in an amount from 0.1 to 20 weight %. Optionally the aqueous suspension may be in the form of foam, and in that case the suspension comprises at least one surfactant selected from anionic surfactants and non-ionic surfactants and any combinations thereof, typically in an amount from 0.001 to 1% w/w.

Further, the suspension may comprise other additives selected from hydrophobicity or hydrophilicity agents, colorants, decorative agents, elasticity modifiers, tensile strength modifiers, or strength modifiers, such as starch, gums or water-soluble polyelectrolytes, decorative pieces such as metal powder etc.

The aqueous suspension is obtained using any suitable mixing method known in the art.

In the method suspension is directed through at least one nozzle. Suitably the amount of nozzles is selected depending on the manufacturing equipment used and on the product which is manufactured.

Any nozzle or extruder suitable for liquids and viscous fluids may be used. When the suspension contains alginates, pectin or carrageenan, suitably a nozzle is used comprising an inner die or orifice for the suspension and outer die or orifice for an aqueous solution comprising at least one cation(as a salt, such as calcium chloride or magnesium sulphite). Alternatively, the solution comprising the cation (salt) may be provided as a spray or mist when using nozzles with one orifice. The cation, when brought with contact for example with alginate or alginic acid, effects very rapid increase on the viscosity of the aqueous suspension whereby the strength of the yarn is increased, making the embodiment of the method utilizing gravitational force very attractive.

The inner diameter of the outlet of the nozzle is smaller than or equal to the maximum length weighed fiber length of the fibers. This helps to orientate the fibers essentially in the direction of the yarn and provides strength and flexibility to the product.

The suspension is conducted through the nozzle(s), which is arranged suitably vertically to provide a continuous yearn of the suspension below each nozzle, falling freely with the aid of gravitational force. In this embodiment it is preferable to use a suspension comprising a rheology modifier selected from alginic acid, sodium alginate, pectin and carrageenan, together with a solution comprising a cation. Particularly preferably the suspension comprises also a dispersion agent. The yarn has sufficient strength and thus no supporting bodies are needed, it can be dewatered and subjected to finishing and other optional steps if needed.

The nozzle(s) may also be arranged in a direction deviating from the vertical direction. The nozzle(s) may be arranged in the vicinity of pieces comprising gutters, where the nozzle directs the flow of the suspension in the gutters, acting as supporting bodies, to provide the yarn. Suitably the gutters are arranged spirally on the surface cylindrical drums as presented in FIG. 1. The number of nozzles is preferably the same as the number of gutters.

After the nozzle the yarn is subjected to dewatering which may include methods based on vacuum, mechanical pressing and/or thermal drying. The dewatering may be carried out by methods utilizing vacuum, mechanical pressing, convection, conduction or radiation of heat, by any suitable heating means such as heated airflow, IR, or contact with heated surface.

After the dry yarn is obtained, it may be subjected to optional finishing selected from pressing, twisting, shredding, pleating, coloring, waxing and any combinations thereof.

The yarn may also be treated with dyes, wax, or silicon oil to provide transparent yarn.

In FIG. 1 one suitable embodiment of the method according to the invention is presented. Fiber suspension (100) comprising fibers and at least one rheology modifier is directed, for example by pumping or feeding from container(s) (10), which may be a pulp tank, using any means for transferring liquids, suitably a pump (not shown in the figure) through nozzles (20a, 20b and 20c), (30a, 30b and 30c) and (40a, 40b and 40c) to gutters (22a, 22b and 22c), (32a, 32b and 32c) and (42a, 42b and 42c), whereby a moist yarn is formed. Said nozzles are arranged in the vicinity of cylindrical and rotating pieces (21), (31) and (41), suitably grooved vacuum cylinders where the grooves or gutters are perforated, and the outlet of each nozzle (20a, 20b and 20c), (30a, 30b and 30c) and (40a, 40b and 40c) is arranged to direct the spray from each nozzle to a gutter (22a, 22b and 22c), (32a, 32b and 32c) and (42a, 42b and 42c) on the cylindrical and rotating pieces (21), (31) and (41). In this figure the number of cylindrical pieces is three, however it may vary from one piece to tens and even hundreds of pieces. The cylindrical pieces may be of any suitable material, preferably of material which can be heated. The gutters (22a, 22b and 22c), (32a, 32b and 32c) and (42a, 42b and 42c) are formed on surface of the cylindrical pieces and each of them form a spiral on said piece. The form, width and depth of the gutter may be chosen upon the yarn or product which is manufactured. The cylindrical pieces, suitably drums, are suitably rotated at constant speed. The moist yarn is dewatered with suitable dewatering means, such as drying means, with heated vacuum cylindrical drums (21, 31,41), where the heating of the drums is carried out by methods known as such, or by providing heated air flow (60), with IR, with vacuum (70) or with any other suitable drying means or combinations thereof. The dry yarn (51, 52, and 53) is transferred from the cylindrical drums to optional finishing, twisting, dyeing etc or use.

Figure 2:
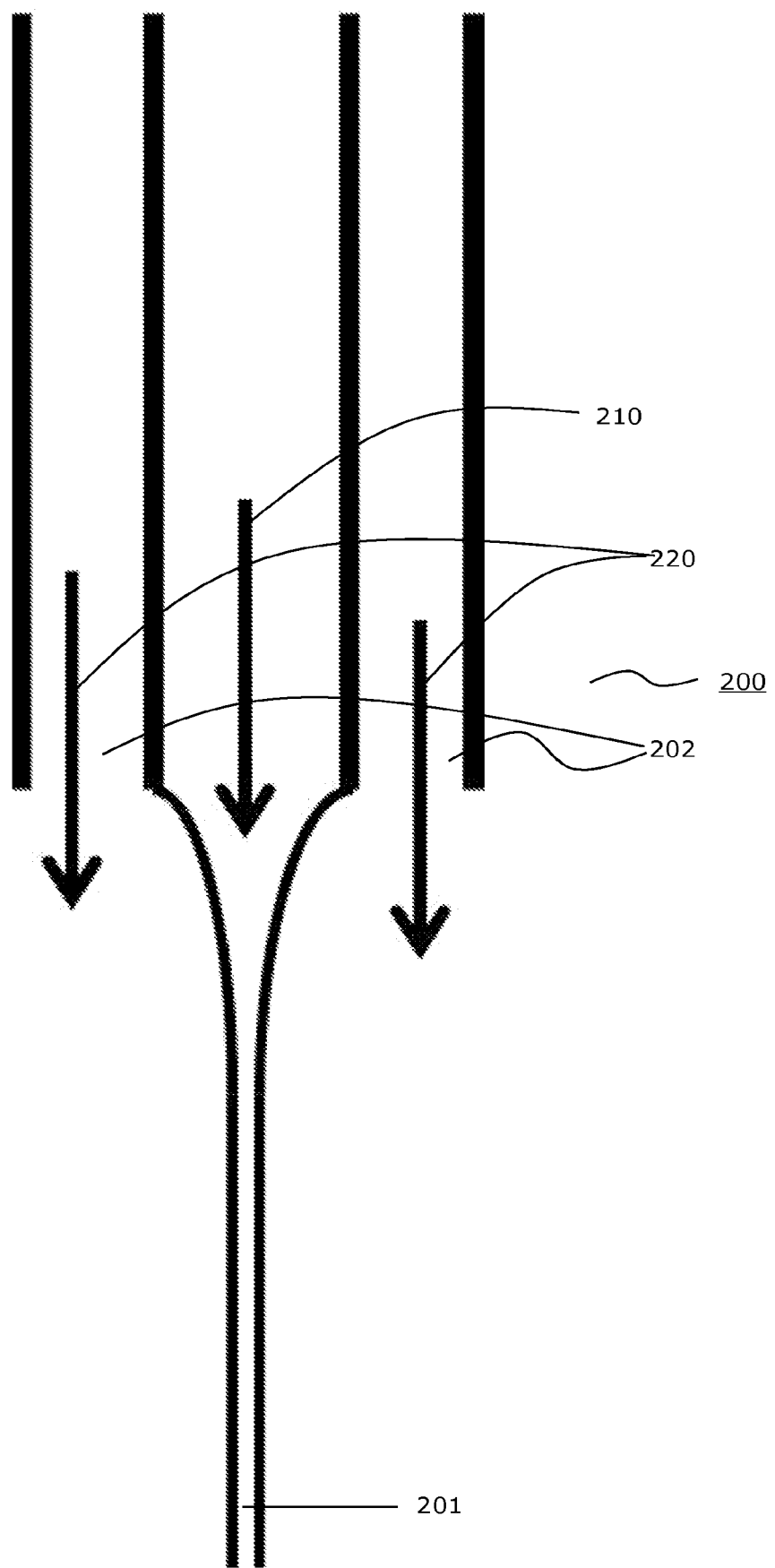
FIG. 2 illustrates one suitable nozzle used in this method.

In FIG. 2 a cross-section picture of a nozzle (200), in this embodiment a circular nozzle is shown. The fiber suspension (210) is fed through the inner die or orifice (201) and if salt or other chemicals (220) are used for crosslinking they may be fed through outer die or orifice (202). Other cross-section geometries besides circular may as well be used, such as elliptical or rectangular.

Moist yarn obtained from the nozzle initially contains water typically from 30 to 99.5% w/w. In the dewatering step the yarn may be dried to desired water content.

The invention provides several advantages. The manufacturing method is very simple and effective, and the equipment needed is simple and relatively cheap. The yarn is produced directly from the fiber suspension; it is not necessary to manufacture first paper. Traditional paper yarn may be replaced with the product obtainable by the method, for use as replacer for traditional yarns in textiles, decorative products, construction and composite materials. Thinner and thicker yarns may be produced ad the properties of the yarns may be varied, such as strength, flexibility, colour, hydrophobicity, hydrophilicity etc.

The rheology of the fiber suspension may be adjusted using rheology modifiers to the viscosity and thixotropyrange where the fiber suspension can be pumped through the nozzle without clogging it, but simultaneously to provide a moist yarn typically in gel form, which has sufficient strength to maintain its form during the drying step. Thus the rheology modifier gives shear thinning nature and strength to the yarn; in the case alginate is used a dispersion agent is typically also needed and the treatment of the moist yarn with a salt solution to provide sufficient strength.

The selection of the inner diameter of the outlet of the nozzle to smaller than or equal to the maximum length weighed fiber length of the fibers achieves the fibers to orientate in the direction of the yarn, which provides the final product flexibility and strength.

The water released after drying may be recovered by condensing and recycled in the method, for example by using a closed system, and thus practically no waste water is formed. Also the amount of water needed in the process is very limited, particularly in the embodiment where the fiber suspension is provided in the form of foam.

Very thin to very thick yarns and ropes may be produced, which may be twisted together to provide products suitable for weaving, knitting, manufacture of carpets, blankets, textiles, dressings etc. Also very soft yarns may be produced for example from bamboo with alginates, particularly suitable for the manufacture or textiles and clothes. Further, very thick ropes may be produced, which may be used for example in interior decoration etc. purposes, as well as yarn and rope suitable for construction industry and in the manufacture of composite structures where the yarn is embedded in a matrix, such as a polymer. The composition of the fiber suspension may be adjusted according to the product that is manufactured.

The product is completely biodegradable if the starting materials used are natural materials.

The need of cotton may be reduced with the method and products of the present invention, where the fibers originate at least partly from more ecological plant material, such as wood and recycled paper.

Particularly, long fiber pulp, suitably manufactured from Nordic pine, may be used in the method to provide a yarn having the thickness of less than 0.1 mm and very good strength properties.

While the invention has been described with respect to specific examples presented in the figures, including presently preferred modes of carrying out the invention, those skilled in the art will appreciate that there are numerous variations and permutations of the above described embodiments that fall within the spirit and scope of the invention. It should be understood that the invention is not limited in its application to the details of construction and arrangements of the components set forth herein. Variations and modifications of the foregoing are within the scope of the present invention.

The invention claimed is:

1. A method for producing a fibrous yarn, the method comprising:
    creating an aqueous suspension comprising virgin plant-based fibers and water;
    generating a moist fibrous yarn in gel form by crosslinking the aqueous suspension using a rheology modifier, wherein the generating further comprises:
        (1) increasing strength of the gel, such that the moist fibrous yarn maintains form during dewatering, by exposing the rheology modifier to an aqueous solution comprising a cation; and
        (2) shear thinning the aqueous suspension by adding, in the aqueous suspension, a dispersion agent configured to modify suspension rheology, wherein the dispersion agent is an anionic long chained polymer; and
    wherein the aqueous suspension is directed through at least one nozzle, wherein the at least one nozzle comprises an inner die or orifice for the aqueous suspension and an outer die or orifice for the aqueous solution comprising the cation; and
    dewatering the moist fibrous yarn to a target water concentration, to produce the fibrous yarn.

2. The method of claim 1, wherein dewatering the moist fibrous yarn to produce the fibrous yarn further comprises:
    drying the moist fibrous yarn using heated vacuum cylindrical drums; and
    removing the fibrous yarn from the heated vacuum cylindrical drums when the target water concentration is reached.

3. The method of claim 1, further comprising:
    collecting water released during dewatering; and
    reusing the collected water in a subsequent aqueous suspension to produce an additional fibrous yarn.

4. The method of claim 1, wherein the cation is selected from a group consisting of $Ca^{2+}$, $Mg^{2+}$, $Sr^{2+}$ and $Ba^{2+}$.

5. The method of claim 1, wherein the rheology modifier is selected from: alginic acid, sodium alginate, pectin, carrageenan, and nanofibrillar cellulose.

6. The method of claim 1, wherein the at least one nozzle comprises a single orifice and the aqueous solution is provided as a spray or mist.

7. The method of claim 1, wherein the at least one nozzle has an inner diameter of an outlet smaller than or equal to a maximum weighted fiber length of the virgin plant-based fibers.

8. The method of claim 1, further comprising adding, to the aqueous suspension, at least one additive selected from a group consisting of: a hydrophobicity agent, a hydrophilicity agent, a colorant, a decorative agent, an elasticity modifier, a tensile strength modifier, a strength modifier, a starch, a gum, a water-soluble polyelectrolyte, decorative pieces and metal powder.

9. The method of claim 1, wherein the virgin plant based fibers have an average length of 2 to 3 mm.

10. The method of claim 1, wherein the virgin plant based fibers are at least one wood fiber selected from a group consisting of spruce fiber, pine fiber, fir fiber, larch fiber, Douglas-fir fiber, hemlock fiber, birch fiber, aspen fiber, poplar fiber, alder fiber, eucalyptus fiber and acacia fiber.

11. The method of claim 1, wherein the virgin plant based fibers are at least one non-wood fiber selected from a group consisting of straw fiber, leaf fiber, bark fiber, seed fiber, hull fiber, flower fiber, vegetable fiber, fruit fiber, corn fiber, cotton fiber, wheat fiber, oat fiber, rye fiber, barley fiber, rice fiber, flax fiber, hemp fiber, manilla hemp fiber, sisal hemp fiber, jute fiber, ramie fiber, kenaf fiber, bagasse fiber, bamboo fiber, reed fiber and peat fiber.

12. The method of claim 1, wherein the rheology modifier is nanofibrillar cellulose having a length greater than 1 μm and an average diameter below 200 nm.

13. The method of claim 12, wherein the nanofibrillar cellulose contains hemicelluose.

14. The method of claim 1, wherein the dispersion agent is selected from a group consisting of carboxymethyl cellulose, anionic starch neutral starch and anionic polyacrylamides.

15. The method of claim 1, wherein the fibrous yarn is not formed from paper.

* * * * *